Figure 1:
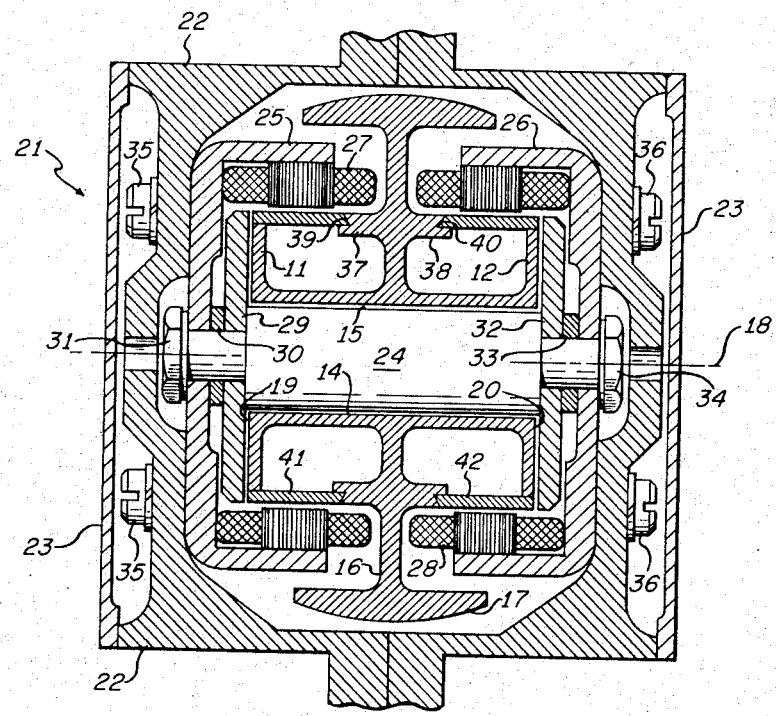

May 30, 1967 R. J. BENATTI ETAL 3,322,986

GYROSCOPIC ROTOR

Filed April 3, 1964

INVENTORS
ROBERT J. BENATTI
JOHN C. DIESELMAN
HENRY W. RAPPUHN
HAROLD C. VANCE JR.
BY Arthur H. Serrell
ATTORNEY

United States Patent Office 3,322,986
Patented May 30, 1967

3,322,986
GYROSCOPIC ROTOR
Robert J. Benatti, East Northport, N.Y., John C. Dieselman, Norwood, Mass., and Henry W. Rappuhn, East Norwich, and Harold C. Vance, Jr., New York, N.Y., assignors to Sperry Rand Corporation, Great Neck, N.Y., a corporation of Delaware
Filed Apr. 3, 1964, Ser. No. 357,081
2 Claims. (Cl. 310—162)

This invention relates to an assemblage or unit whose parts provide a gyroscopic rotor and two electrical armatures of the hysteresis type. The unit is mounted in a fixed housing or closed case by a gas bearing of the hydrodynamic pressure type to rotate about an axis. Two synchronous motors energized from an A.C. source provide the motive power required to turn the unit about the axis. In the provided motor structure, the case includes a wound stator arranged in concentric relation to the axis for each of the related armature parts of the unit.

In the improved assemblage, the rotor part includes an integral hub, spoke or web and momentum rim piece of non-magnetic material. The hub configuration of the rotor is preferably that of a spool with axially spaced end walls, a wall between the end walls and a spoke wall for the rim axially equidistant from the faces of the end walls. The spool structure of the rotor provides a portion of the gas bearing supporting the unit within the case.

The electrical armature parts of the assemblage are formed of a flux conductive material that is magnetized by the field produced when the stators of the motor are excited. Heretofore, motor parts of the character described in the configuration of a ring were attached to the rotor part by press or shrink fitting the same circumferentially to a portion of the rotor. The attachment stressed the parts internally throughout its length dimension to unfavorably modify the characteristics of the motor. In the improved structure, the armature parts or hysteresis rings are attached at their ends between the respective sides of the spoke wall or rotor web and the end walls of the hub. Here, the rings provide axially extending ribs or bridges that are not prestressed and which serve to define a hollow hub structure comprised of two axially spaced cylindrical compartments of equal volume with a common interior spoke wall which serves to provide the main mechanical coupling between the rotor bearing wall and the momentum rim. The armature ribs of the assemblage therefore are a part of the hub of the rotor.

The improved thin walled, hollow hub structure of the assemblage permits the angular momentum of the rotor to be increased for a given radial and axial dimension. It also improves the efficiency of the drive motors, more readily dissipates the heat generated by operation of the motors, reduces the windage loss and provides a stress free rotor.

Figure 2:
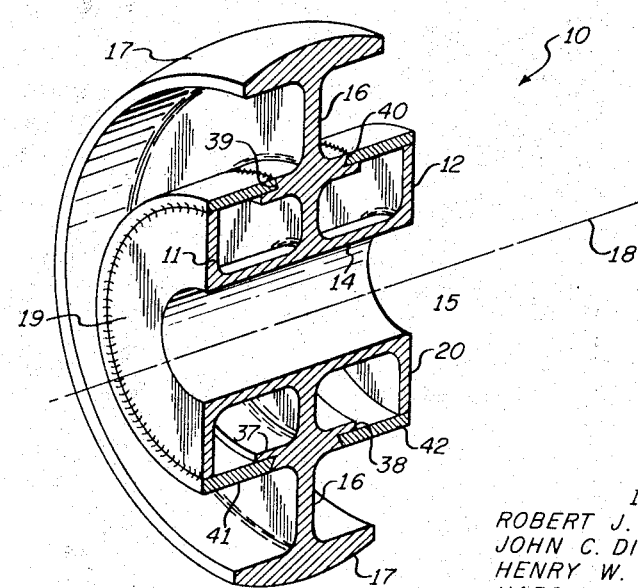

Further advantages, features and structural details of the improved assemblage will be apparent from the following description when read in relation to the accompanying drawing, wherein:

FIG. 1 is a cross sectional view showing a gyroscopic rotor case in which a rotor and armature assemblage constructed in accordance with the present invention is mounted for rotation about an axis, and FIG. 2 is a diametric cross sectional perspective detail view of the assemblage shown in FIG. 1.

As shown in the drawing, the improved unit or assemblage consists of three attached parts. One of the parts is provided by a gyroscopic rotor 10 constructed of a core or integral piece of material having a high reluctance to magnetic flux and the other two parts are the hysteresis rings which constitute motor armatures of the spin motors.

As illustrated, the gyroscope rotor and spin motors are completely symmetrical with respect to a plane bisecting the rotor and normal to the rotor spin axis. In the preferred embodiment shown, the integral core structure has the general configuration of a spool including a thin walled right cylinder 14, radially extending, thin walled parallel end flanges 11 and 12, a momentum rim 17 and a relatively thin radially extending web portion 16 midway between the ends of the cylinder 14 coupling the momentum rim 17 to the rotor cylinder 14. The internal surface 15 of the rotor cylinder 14 constitutes one surface of a hydrodynamic bearing support while the outer surfaces 19 and 20 of the parallel flanges 11 and 12 constitute the end or thrust bearing surfaces of such support as will be further described. The spin axis of the rotor is indicated at 18 and, of course, is coincident with the axis the rotor cylinder 14.

The structure shown in FIG. 1 for housing the improved assemblage include a case 21 of interfitting frame 22 and cylindrical sleeve 23 parts that provide a hermetically sealed receptacle for the compressible bearing gas included therein. Bore 15 of cylinder 14 of the assemblage provides the journal of a gas bearing that separates the wall 14 from a fixed shaft 24 that threads the bore. In the form of the housing structure shown in FIG. 1, shaft 24 is fixedly connected to the frame 22 through two axially spaced plates 25, 26 to which the respective wound stators 27, 28 of the rotor drive motors are fixedly attached. The connection between one end of the shaft 24 and the plate 25 includes a threaded end of reduced diameter on which are clamped a thrust bearing pad or plate 29, a spacer 30 and a clamping nut 31. Similar structure for the opposite end of shaft 24 includes the thrust pad 32, spacer 33 and nut 34. The described structure is made rigid with the frame through the mounting screws 35 and 36 that connect the respective plates 25 and 26 to the frame 22.

With rotation of the assemblage about the axis 18, the relatively movable and fixed elements of the case structure in FIG. 1 separate in accordance with the principles disclosed in U.S. Letters Patent No. 2,884,282, issued April 28, 1959 to H. Sixsmith without requiring the connection of the receptacle to a source of external pressure. The axially spaced rigid end plates 29 and 32 also cooperate with the opposing exterior faces 19 and 20 of the end walls of the hub structure to provide self centering thrust bearings.

In the embodiment of the invention shown in the drawing, the central web wall 16 includes symmetrical bosses 37 and 38 on its respective sides, radially intermediate the cylinder wall 14 and the momentum rim 17. Bosses 37 and 38 are provided with respective grooves 39 and 40 formed therein and concentric to the axis 18. The end walls or flanges 11 and 12 include circular rims or peripheries concentric to the axis 18 at the same radial distance from the cylinder 14 as the grooves 39 and 40. In the improved unit, one of the matching motor armature parts 41 is a hysteresis ring concentric to the axis 18 that provides an axial rib or bridge parallel to the cylinder wall 14 and serving to rigidly connect the boss 37 and hence the rotor flange 16 and the end wall 11. The inside diameter of the ring 41 is such that the same abuts groove wall 39 and overlies the outer periphery of the end wall 11. The parts are preferably securely attached at the respective ends of the ring 41 as by electron beam welding. The other armature part of the assemblage comprises ring 42 matching the configuration of part 41 that provides a further axial rib or bridge in the hub of the rotor rigidly connecting the other side of the rotor web 16 with the other end flange 12 of the hub. Like ring 41, the ring 42 is preferably welded to the rotor part with one of its ends abutting groove wall 40 and the other end fitting the end flange 12 of the hub. The grooves 39, 40, the periphery of flanges 12 and 13 and rings 40 and 41 are precisely machined and since the parts are welded together, no permanent internal stresses in the parts can occur. The armature rings 40 and 41 also close the hub structure of the rotor part to minimize windage loss as well as provide two axially spaced cylindrical compartments of equal volume with a common central spoke wall 16. The walls of the hub compartments provide ready dissipations of the heat therein resulting from the proximity of the stators 27 and 28 operating to drive the assemblage. The thin walled but rigid hub structure permits maximum mass distribution at the periphery or momentum rim of the rotor.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A gyroscopic rotor, bearing and electrical armature assembly adapted to be hydrodynamically supported for spinning about a spin axis comprising
   (a) a thin walled cylindrical member having its major axis coincident with said spin axis, the interior surface thereof providing a radial support surface for a hydrodynamic bearing,
   (b) radially extending, thin walled flange members at each end of said cylindrical member and concentric with said spin axis, the end surfaces of said flange members providing an axial support surface for said hydrodynamic bearing,
   (c) a momentum rim radially spaced from said cylindrical member,
   (d) a web member connected between said cylindrical member and said rim intermediate the ends of said cylindrical member, and
   (e) a pair of thin walled electrical armature rings each concentric with said spin axis and extending substantially parallel with said spin axis, said rings extending between and being rigidly secured to the periphery of said end flange and to said web member radially intermediate said cylindrical member and said momentum rim.

2. The gyroscopic rotor assembly as set forth in claim 1 wherein said cylindrical member, flange members, rim member and web member comprise an integral structure formed from a non-magnetic material and wherein said armature rings are separately formed of a highly magnetizable material.

References Cited
UNITED STATES PATENTS

| | | | |
|---|---|---|---|
| 2,767,339 | 10/1956 | Hatfield | 310—261 X |
| 2,806,158 | 9/1957 | Emery | 310—103 X |
| 2,857,534 | 10/1958 | Beach | 310—268 X |
| 2,889,474 | 6/1959 | Macks | 310—90 |
| 2,983,832 | 5/1961 | Macks | 310—90 |
| 3,101,424 | 8/1963 | Burgwin | 310—42 |
| 3,164,735 | 1/1965 | Lichowsky | 310—162 |

MILTON O. HIRSHFIELD, *Primary Examiner.*

J. W. GIBBS, *Assistant Examiner.*